UNITED STATES PATENT OFFICE.

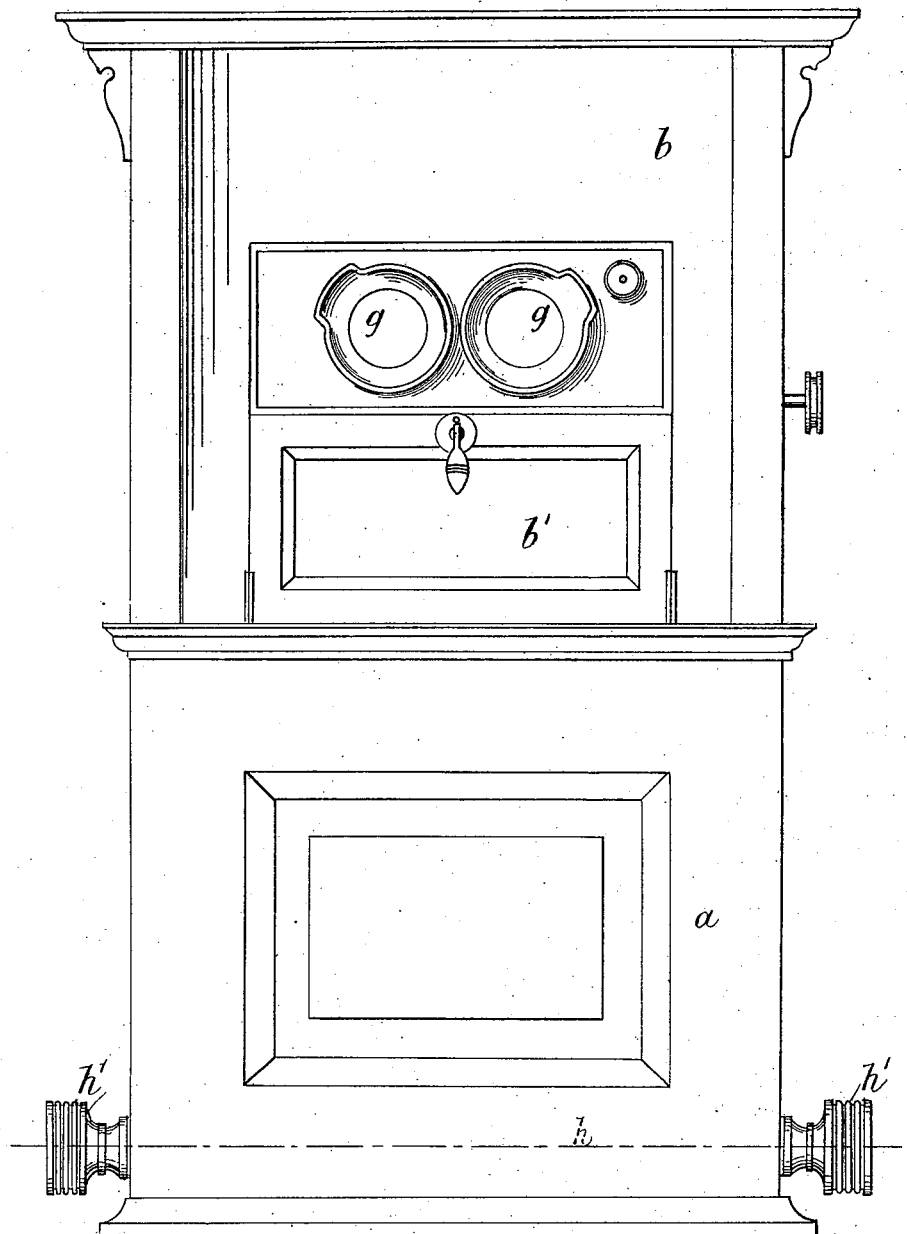

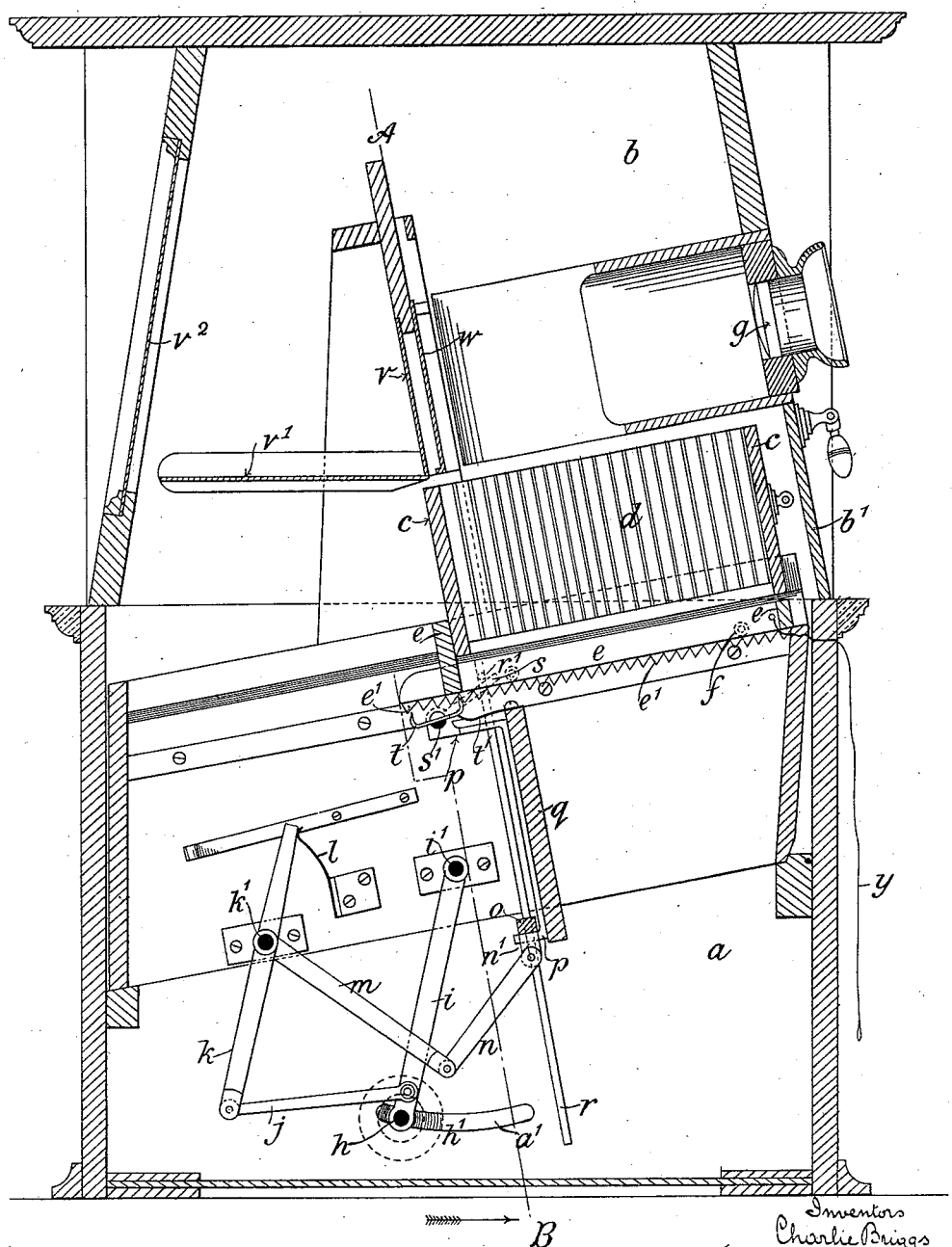

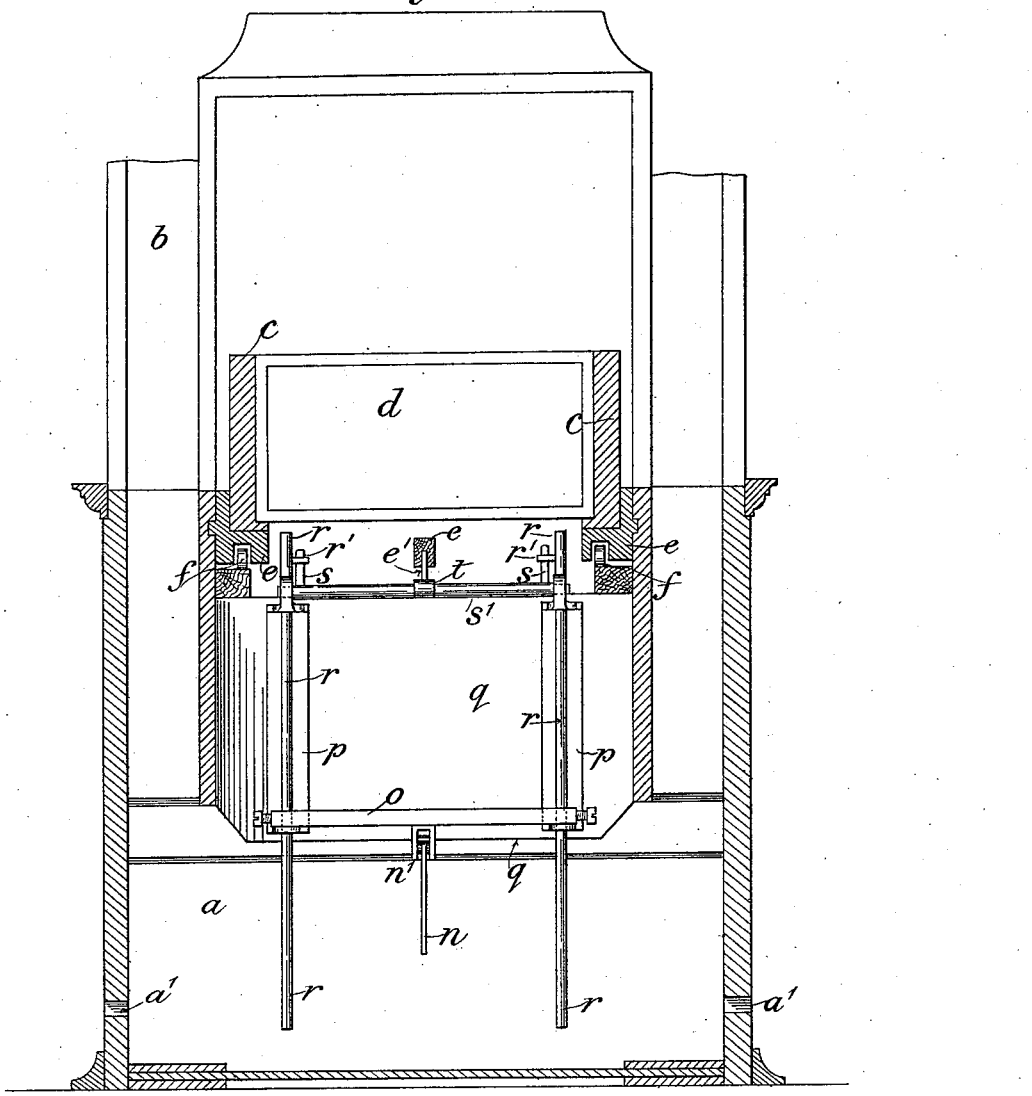

CHARLIE BRIGGS AND FREDERICK WILLIAM MASTERS, OF MANCHESTER, ENGLAND.

STEREOSCOPE.

SPECIFICATION forming part of Letters Patent No. 564,466, dated July 21, 1896.

Application filed April 30, 1896. Serial No. 589,746. (No model.) Patented in England July 2, 1895, No. 12,708.

*To all whom it may concern:*

Be it known that we, CHARLIE BRIGGS and FREDERICK WILLIAM MASTERS, subjects of the Queen of Great Britain, and residents of Manchester, in the county of Lancaster, England, have invented certain new and useful Improvements in Stereoscopes, (for which we have obtained Letters Patent in Great Britain, No. 12,708, bearing date July 2, 1895,) of which the following is a specification.

Our invention relates to improvements in stereoscopes and similar instruments for viewing stereoscopic and other photographs or pictures; and the chief object of our improvements is to improve the construction and arrangement of parts, so that the slides or pictures can be changed much more quickly and conveniently than at present.

In carrying our improvements into effect we fit any desired number of stereoscopic or other slides or pictures in a drawer or receptacle provided with grooves or divisions which separate the slides. This drawer full of slides is placed upon a movable carriage mounted in the stereoscope in such manner that by moving a lever or handle and thereby actuating sliding rods or equivalent mechanism one of the slides of the series in the drawer is raised and brought into the correct position to be viewed through the lenses or lens. When it is desired to change the slide the lever or handle is moved back, by which means the slide descends into the drawer, and then the sliding carriage, with the drawer, is moved forward sufficiently to bring the next slide into position, so that by again moving the lever or handle the next slide is raised into the correct position for being viewed.

In order that our invention may be fully understood and readily carried into effect, we will describe the accompanying three sheets of drawings, reference being had to the letters marked thereon.

Figure 1 is a front elevation, Fig. 2 a vertical section, and Fig. 3 a front sectional elevation on the line A B, Fig. 2, of a stereoscope made according to our invention.

In the drawings, $a$ represents the lower and $b$ the upper portion of a stereoscope, and $c$ a drawer or receptacle with grooves or divisions in which the stereoscopic or other slides or pictures $d$ are fitted. This drawer full of slides is placed upon a movable carriage $e$, preferably mounted on small antifriction-rollers $f$.

The drawings represent all the slides in the drawer, and in order to bring a slide into the correct position to be viewed through the lenses $g$ we employ a pair of knobs or handles $h'$, placed outside the casing, one at each end of a rod $h$, which passes through curved slot $a'$ in the frame, and also through the end of a lever $i$, pivoted at $i'$ to the frame $a$. To this lever is pivoted a link $j$, connected to one end of a lever $k$, which is secured to a shaft $k'$ and is held in the position shown in Fig. 2 by means of a spring $l$. Secured to the shaft $k'$ is an arm $m$, pivoted to a link $n$, which is pivoted to a bracket $n'$, secured to a cross-rail $o$, which is free to be moved up and down along a bracket $p$, secured to a cross-piece $q$. This bracket $p$ has a bearing at each end for a pair of rods $r$, secured to the rail $o$, through which they pass, and to the upper end of each rod $r$ is secured a pin $r'$. The pins $r'$ act upon a pair of arms $s$, secured upon a cross-shaft $s'$, which carries near its center a double-armed pawl $t$, one end of which is held by a spring $t'$ in contact with a rack $e$, secured to the under side of the sliding carriage $e$. When the shaft $s'$ is oscillated, the rack $e'$ is free to move tooth by tooth at each oscillation for the purpose of changing the position of the carriage $e$, drawer $c$, and slides $d$.

In the upper part of the stereoscope $b$ is fitted a frame which carries a sheet of ground glass $v$ and a horizontal mirror $v'$ and a sheet of ground glass $v^2$, placed behind the glass $v$, as usual. Fitted in slideways immediately above the last slide $d$ in the drawer is a shutter $w$, which prevents too much light striking on the eye of the person viewing during the changing of the pictures. A cord $y$ is secured to the frame $e$ and passed through a hole in the front of the stereoscope for pulling up the carriage $e$ and drawer $c$ into the position shown in Fig. 2 or any intermediate position between the back and front position of the carriage $e$.

In order to view the slides $d$, a drawer full of slides is placed upon the carriage $e$. The handles $h'$ are then drawn from the position shown in Fig. 2 along the slots $a'$ toward the front of the instrument, which moves the parts and connections $i$, $j$, $k$, $k'$, and $m$, thereby lifting the cross-rail $o$ and with it the two rods $r$, which come under the end slide $d$ and lift it and the shutter $w$, the slide being raised into the correct position to be viewed through the lenses $g$. To change the slide, the handles $h'$ are moved back to the position shown in Fig. 2, thus drawing down the rods $r$ and the shutter and allowing the slide to descend and resume its position in the drawer. A further backward movement of the handles $h'$ causes the pins $r'$ to act upon the arms $s$ and turn the shaft $s'$ on its axis sufficiently to counteract the spring $t'$ and withdraw the front arm of pawl $t$ from the rack $e'$, and so allow the rack and carriage $e$ to move one tooth, the other arm of the pawl $t$ preventing the rack moving more than one tooth. The drawer $c$ also moves with the carriage $e$, and so brings the next slide $d$ over the rods $r$ into the position for being raised into view when the handles are drawn forward. At each forward movement, therefore, of the handles and return movement to the far end of the slots $a'$, a slide $d$ will be raised and lowered and the rack actuated to allow the carriage and drawer to slide one tooth of the rack over the pawl $t$ and so bring another slide over the rods $r$.

When all the slides in the drawer have been examined, the string $y$ is pulled forward until the drawer is again in the position shown in Fig. 2, so that it can then be withdrawn by opening a door $b'$ and another drawer of slides substituted.

It will be readily understood that we do not wish to limit ourselves to the exact details of the mechanism herein shown and described, as the same may be modified or varied without departing from the nature of our invention. For example, instead of the levers, links, rocking shaft, and connections specified any suitable equivalents, such as a rack-and-pinion motion, might be employed for raising and lowering the stereoscopic slides, and, further, any other suitable escapement might be employed to bring the slides successively into the correct position for being viewed.

Having now particularly described and ascertained the nature of our said invention and in what manner the same is to be performed, we declare that what we claim, and desire to secure by Letters Patent of the United States, is—

1. In combination in a stereoscope for the carriage the plates, the tooth-bar connected therewith, the pivoted pawl controlling the movement of the carriage, the vertically-movable rods arranged to raise the plates and also to engage the pawl and means for operating the rods, substantially as described.

2. In combination, in a stereoscope, the carriage for the plates, the toothed bar connected thereto, the pivoted double pawl controlling the tooth-bar, the rods movable upwardly for raising the plates, said rods having pins to operate the double pawl on their return movement, and means for operating the rods.

3. In combination, the movable carriage for the plates, the toothed bar connected thereto, the vertically-movable rods, the pawl to be controlled thereby, the slotted frame, the handles extending through the same to be moved from front to the rear and the connections between said handles and the operating-rods.

In witness whereof we have hereunto set our hands in presence of two witnesses.

CHARLIE BRIGGS.
FREDERICK WILLIAM MASTERS.

Witnesses:
 H. B. BARLOW,
 HERBERT R. ABBEY.